Patented Aug. 20, 1946

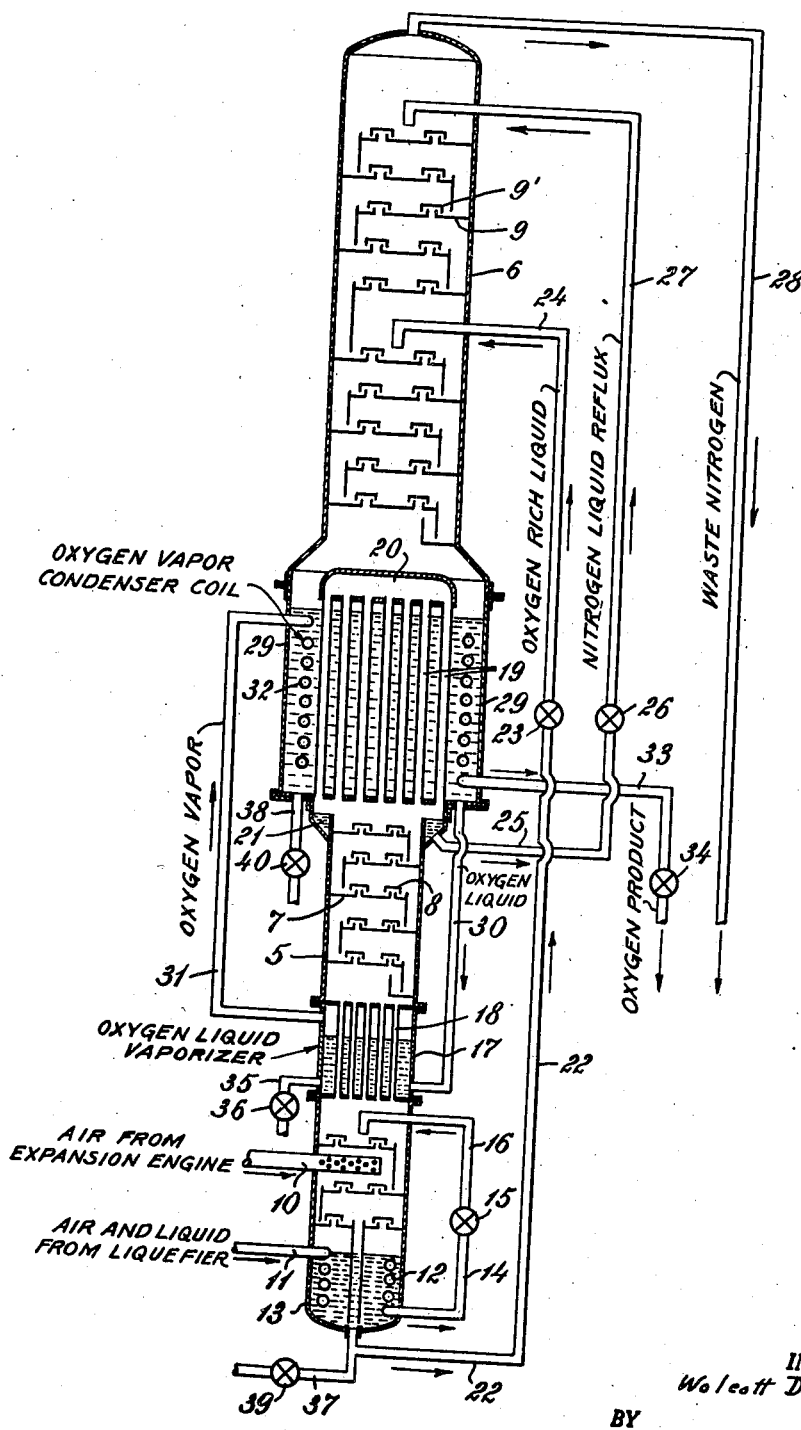

2,406,003

UNITED STATES PATENT OFFICE 2,406,003

METHOD AND APPARATUS FOR OBTAINING PURIFIED LIQUID OXYGEN

Wolcott Dennis, Darien, Conn., assignor to Air Reduction Company, Incorporated, New York, N. Y., a corporation of New York Application October 1, 1943, Serial No. 504,578

5 Claims. (Cl. 62—175.5)

This invention relates to the separation and recovery of pure liquid oxygen from atmospheric air by liquefaction and rectification, and particularly to improvements whereby impurities accumulating in the liquid oxygen produced by rectification may be eliminated effectively.

In the usual methods of separating oxygen from atmospheric air, the liquid oxygen which accumulates at the bottom of the rectifier may contain certain impurities in relatively minute quantity, such as solidified hydrocarbons, oil, carbon dioxide and water, which have not been completely eliminated from the air before liquefaction and separation. Normally the liquid oxygen is vaporized and withdrawn, leaving the impurities which are removed by purging the column from time to time. Where liquid oxygen is desired as a product, it cannot be withdrawn directly without these impurities, which make the product unsuitable for many uses.

It is the object of the present invention to provide a method and apparatus which afford a high yield of liquid oxygen free from impurities such as those mentioned.

Another object of the invention is the provision of a method and apparatus which facilitate the recovery of the desired oxygen product in liquid phase without sacrificing the efficiency of the procedure.

Other objects and advantages of the invention will be apparent as it is better understood by reference to the following specification and accompanying drawing, illustrating an apparatus suitable for the practice of the invention.

In carrying out the invention, the air is initially compressed to the desired pressure and cooled. Thereafter a portion of the air may be delivered through a liquifier which is cooled by products of the separation, while the remaining portion is expanded in an engine to a lower pressure. These operations are well known, being thus normally employed in the familiar Claude system for the separation of the constituents of gaseous mixtures such as air, and hence are not illustrated in the accompanying drawing.

Referring to the drawing, 5 indicates a rectification column operating at relatively elevated pressure, for example about 5 atmospheres, and 6 is an auxiliary column operating at low pressure, for example a little above 1 atmosphere. The column 5 is provided with the usual trays 7 having bubble caps 8 of the familiar form to facilitate contact of the liquid and vapors to effect rectification. The column 6 is provided with similar trays 9 and bubble caps 9'.

Air from the expansion engine at the pressure prevailing in the column 5 is introduced to a pipe 10 near the lower end of the column. Liquid air from the liquefier is delivered by a pipe 11 to a coil 12 which is immersed in liquid in the vaporizer section 13 of the column 5. From the coil 12, the liquid air is delivered through a pipe 14 and expansion valve 15 and enters the lower part of the column 5 through a pipe 16. The liquid passes downwardly over the trays 7 while vapors from the vaporizer section 13 rise through the bubble caps 8, effecting partial rectification of the liquid air introduced through the pipe 16.

A condenser section 17 having a plurality of tubes 18 is provided in the column 5, and the vapors pass upwardly through the tubes 18 with partial condensation and consequent enrichment in oxygen of the liquid which flows backwardly. The vapors continue upwardly through the trays 7 of the column 5 to a condenser consisting of a plurality of tubes 19 terminating in a header 20. The vapors passing upwardly through the tubes 19 are totally condensed and the liquid formed returns through the tubes. A portion of this liquid falls upon the trays 7, while the balance is delivered to an annular collector 21. The liquid formed in the condenser tubes 19 is comparatively rich in nitrogen, since most of the oxygen has been separated on the trays 7 in the form of liquid which accumulates in the vaporizer section 13.

The oxygen-rich liquid from the vaporizer section 13 is withdrawn through a pipe 22 and delivered through expansion valve 23 and pipe 24 to the middle section of the column 6, in which the pressure is maintained considerably below that prevailing in the column 5. The nitrogen-rich liquid from the collector 21 is delivered by a pipe 25 through an expansion valve 26 and thence through pipe 27 to the top of the column 6, thus supplying the reflux liquid necessary to complete the separation of the desired constituents. The effluent or waste gas escapes through a pipe 28 from the top of the column.

Surrounding the condenser tubes 19 is a vaporizer section 29 which receives the liquid oxygen formed as the result of rectification in the column 6. This liquid contains the impurities hereinbefore mentioned. To remove the impurities, the liquid is conveyed through a pipe 30 into the condenser section 17 of the column 5 where it surrounds the tubes 18. The liquid in the vaporizer 29 is under relatively low pressure, but the liquid in the condenser section 17 is under a static head of the column of liquid in the pipe 30 and vaporizer section 29. The liquid is vaporized in the condenser section 17, affording oxygen in the vapor phase, free from impurities. The latter remain in the condenser section 17. The vapor phase oxygen is conveyed through a pipe 31 to a coil 32 submerged in the liquid surrounding the tubes 19, and since this vapor is under the static head provided as hereinbefore described, it is readily liquefied by heat exchange with the liquid in the vaporizer 29. The liquid oxygen product is withdrawn from the coil 32 through a pipe 33 controlled by a valve 34 and is delivered to any suitable storage receptacle.

A purge 35 controlled by a valve 36 is connected to the condenser section 17 to permit withdrawal from time to time of liquid containing impurities. Purges 37 and 38, controlled by valves 39 and 40, similarly permit removal of liquid from the vaporizer sections 13 and 29.

By locating the condenser section 17 in the high pressure column at a point below the main oxygen vaporizer 29, it is possible by virtue of the liquid head available, to vaporize the impure oxygen product at sufficient pressure to cause the evolved vapor to condense in the condenser coil 32 by heat exchange with the liquid surrounding the coil at lower pressure. Since all feeds to the low pressure column are substantially liquid and since the vaporizer is situated at the lower end of said column, it is possible to maintain a maximum of reflux thus ensuring a high degree of rectification. The method and apparatus as described afford a more efficient procedure and structure permitting the recovery of oxygen in a liquid form free from impurities and substantially without serious losses.

Various changes may be made in the details of the apparatus and the operation thereof without departing from the invention or sacrificing the advantages thereof.

I claim:

1. The method of recovering liquid oxygen free from impurities by separation from atmospheric air which comprises separating nitrogen from the oxygen of the air by liquefaction and rectification, thereby producing a first body of liquid oxygen, delivering liquid oxygen from the first body to a second body of liquid at a lower level under the static head of the first body, vaporizing the liquid oxygen of the second body by heat exchange with vapors produced by the rectification and reliquefying the oxygen vapor by heat exchange with the first body of liquid oxygen.

2. The method of recovering liquid oxygen free from impurities by separation from atmospheric air which comprises separating nitrogen from the oxygen of the air by liquefaction and rectification, thereby producing a first body of liquid oxygen at a pressure slightly exceeding one atmosphere, delivering liquid oxygen from the first body to a second body of liquid at a lower level under the static head of the first body, vaporizing the liquid oxygen of the second body by heat exchange with vapors produced by the rectification and reliquefying the oxygen vapor by heat exchange with the first body of liquid oxygen.

3. In the method of recovering liquid oxygen free from impurities by separation from atmospheric air, the steps of maintaining two bodies of liquid oxygen at different levels, the lower body being subject to the static head of the upper body, vaporizing oxygen from the lower body and reliquefying the vaporized oxygen by heat exchange with the liquid of the upper body.

4. In an apparatus for recovering liquid oxygen from atmospheric air, two superposed rectifiers, a vaporizer at the bottom of the upper column, a vaporizer in the lower column, a connection between the two vaporizers whereby liquid in the lower vaporizer is subject to the static head of liquid in the upper vaporizer, and a condenser in the upper vaporizer connected to the lower vaporizer to receive and reliquefy the vapor delivered from the lower vaporizer.

5. In an apparatus for recovering liquid oxygen from atmospheric air, means for maintaining two bodies of liquid oxygen at different levels, a connection whereby the body at the lower level is maintained under the static head of the liquid at the higher level, a condenser within the body at the higher level and means for delivering vapor from the body at the lower level to the condenser.

WOLCOTT DENNIS.